US011036259B2

United States Patent
Chou et al.

(10) Patent No.: US 11,036,259 B2
(45) Date of Patent: Jun. 15, 2021

(54) MOBILE DEVICE SCREEN PROTECTOR SYSTEM

(71) Applicant: Superior Communications, Inc., Irwindale, CA (US)

(72) Inventors: Vivian Wei Fen Chou, Diamond Bar, CA (US); Eugene Chun, Claremont, CA (US)

(73) Assignee: Superior Communications, Inc., Irwindale, CA (US)

(*) Notice: Subject to any disclaimer, the term of this patent is extended or adjusted under 35 U.S.C. 154(b) by 91 days.

(21) Appl. No.: 16/044,389

(22) Filed: Jul. 24, 2018

(65) Prior Publication Data

US 2019/0033922 A1 Jan. 31, 2019

Related U.S. Application Data

(60) Provisional application No. 62/536,587, filed on Jul. 25, 2017.

(51) Int. Cl.
*G06F 1/16* (2006.01)
*B32B 7/06* (2019.01)
*C09J 7/40* (2018.01)

(52) U.S. Cl.
CPC .......... *G06F 1/1656* (2013.01); *G06F 1/1626* (2013.01); *B32B 7/06* (2013.01); *C09J 7/40* (2018.01); *G06F 2200/1633* (2013.01); *G06F 2200/1634* (2013.01); *Y10T 428/14* (2015.01)

(58) Field of Classification Search
CPC ................ G06F 1/1626; G06F 1/1656; G06F 2200/1633; G06F 2200/1634; Y10T 428/14
See application file for complete search history.

(56) References Cited

U.S. PATENT DOCUMENTS

| | | | |
|---|---|---|---|
| 8,517,367 B1* | 8/2013 | Napier | B32B 37/18 269/289 R |
| 9,688,016 B2* | 6/2017 | Rostami | B29C 63/0004 |
| 10,555,445 B2* | 2/2020 | Patel | H05K 13/00 |
| 2012/0211170 A1* | 8/2012 | Patel | B29C 63/0047 156/538 |
| 2013/0299075 A1* | 11/2013 | Colby | B32B 7/06 156/249 |
| 2015/0056395 A1* | 2/2015 | Lin | B32B 7/06 428/41.7 |
| 2015/0314523 A1* | 11/2015 | Mason | B29C 63/02 156/247 |

* cited by examiner

*Primary Examiner* — Patricia L. Nordmeyer
(74) *Attorney, Agent, or Firm* — Snell & Wilmer L.L.P.

(57) ABSTRACT

Methods, systems, and apparatus for a mobile device screen protector system. The system includes a screen protector configured to attach to the screen of the mobile device. The system includes a back film removably attached to the screen protector. The system includes a front film having a screen protector portion and an anchor portion extending away from the screen protector portion and configured to be removably attached to at least one of an edge and a back side of the mobile device via an adhesive.

16 Claims, 6 Drawing Sheets

FIG. 4

MOBILE DEVICE SCREEN PROTECTOR SYSTEM

CROSS-REFERENCE TO RELATED APPLICATIONS

This application claims priority to and the benefit of U.S. Provisional Application No. 62/536,587, titled "MOBILE DEVICE SCREEN PROTECTOR SYSTEM," filed on Jul. 25, 2017, and the entirety of which is hereby incorporated by reference herein.

BACKGROUND

1. Field of the Invention

This specification relates to methods, systems, and apparatus for a mobile device screen protector system.

2. Description of the Related Art

Mobile devices, such as a smartphone or a tablet computer, may be protected with a screen protector. The screen protector may be made of plastic, glass, or any other clear material. The screen protector may have an adhesive applied to a side which makes contact with the screen of the mobile device so that the screen protector may remain attached to the screen of the mobile device. The orientation of a screen protector, once applied, may be difficult to adjust, since the adhesive prevents the screen protector from sliding laterally with respect to the screen, and removing the screen protector entirely may diminish the integrity of the screen protector and/or the adhesive. Accordingly, it is desirable to apply the screen protector properly on the first attempt.

SUMMARY OF THE INVENTION

A mobile device screen protector system is described herein. The system includes a screen protector having a front surface, a back surface, and an outer periphery, the back surface being configured to attach to the screen of the mobile device. The system also includes a back film removably attached to the back surface of the screen protector. The system also includes a front film having a screen protector portion and an anchor portion extending away from the screen protector portion, the screen protector portion being removably attached to the front surface of the screen protector and the anchor portion configured to be removably attached to at least one of an edge and a back side of the mobile device via an adhesive.

A film for maintaining an alignment of a screen protector and a mobile device when applying the screen protector onto a screen of the mobile device is described herein. The film includes a screen protector portion removably attached to a front surface of the screen protector. The film also includes an anchor portion connected to and extending away from the screen protector portion, the anchor portion configured to be removably attached to at least one of an edge and a back side of the mobile device via an adhesive.

A method of maintaining an alignment of a screen protector and a mobile device when applying the screen protector onto a screen of the mobile device is described herein. The method includes attaching an anchor portion of a film to at least one of an edge and a backside of the mobile device. The method also includes attaching the back surface of the screen protector to the screen of the mobile device and removing the anchor portion of the film from the mobile device.

BRIEF DESCRIPTION OF THE DRAWINGS

Other systems, methods, features, and advantages of the present invention will be apparent to one skilled in the art upon examination of the following figures and detailed description. Component parts shown in the drawings are not necessarily to scale, and may be exaggerated to better illustrate the important features of the present invention.

DETAILED DESCRIPTION

Disclosed herein are systems, apparatuses, and methods for a mobile device screen protector system. Applying a mobile device screen protector correctly on a first attempt may be difficult. Conventional mobile device screen protectors have a protective film on the side of the screen protector making contact with the mobile device. Many approaches may be taken to apply the screen protector to the mobile device once the protective film is removed and the adhesive is exposed. However, many conventional approaches to applying the screen protector to the mobile device rely on steady hands and an ability to project how the screen protector may rest on the mobile device as the user applies the screen protector. Accordingly, there is a need for a system which aligns the screen protector while the protective film is intact, and anchors the screen protector such that when the protective film is removed, the screen protector may be reliably realigned with the mobile device.

Figure 1A:
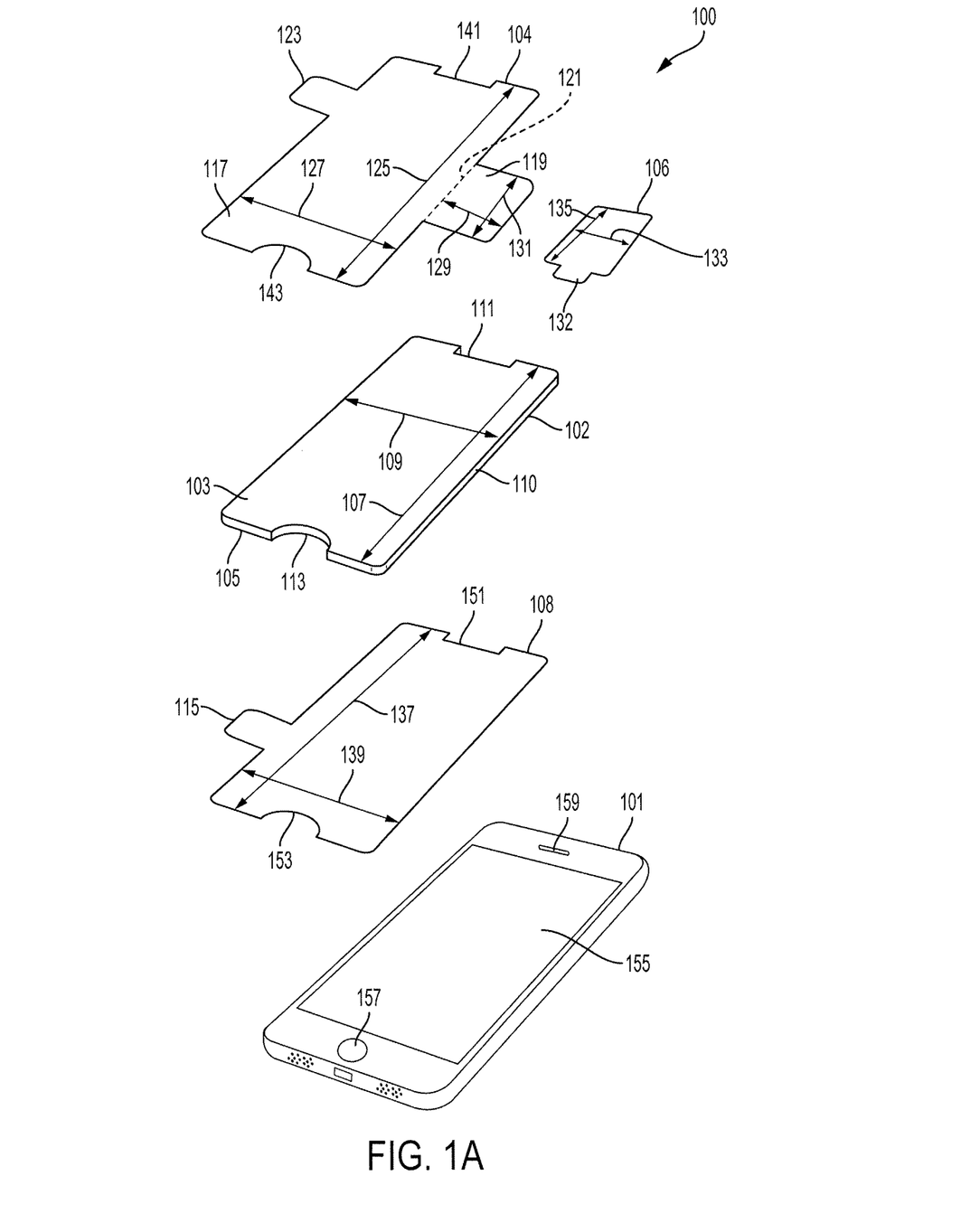
FIG. 1A illustrates the parts of a mobile device screen protector system, according to various aspects of the present invention.

FIG. 1A illustrates the mobile device screen protector system 100 and a mobile device 101. The system 100 includes a screen protector 102, a front film 104, and a back film 108. The mobile device 101 includes a screen 155, a front button 157, and a speaker 159.

The screen protector 102 may be a rigid screen protector made of tempered glass. The screen protector 102 may be a flexible screen protector made of a plastic material. In some embodiments, the screen protector 102 may be a laminate of tempered glass and a plastic material. In other embodiments, the screen protector 102 may be made of any other substantially clear material.

The screen protector 102 has a front surface 103 and a back surface 105. The back surface 105 is configured to contact the screen 155 of the mobile device 101. The front surface 103 is configured to be exposed and protect the screen 155 of the mobile device 101. In some embodiments, the screen protector 102 may have an adhesive applied to the back surface 105. The adhesive may assist in the screen protector 102 remaining attached to the screen 155 of the mobile device 101. In some embodiments, the screen protector 102 may be removed from the screen 155 of the mobile device 101 without leaving any adhesive remaining on the screen 155.

The adhesive may cover the entire back surface 105 of the screen protector 102. In some embodiments, the adhesive may cover only a portion of the back surface 105 of the screen protector 102. In other embodiments, the screen protector 102 may be configured to attach to the screen 155 of the mobile device 101 without adhesive. For example, the screen protector 102 may attach to the screen 155 of the mobile device 101 via an electrostatic force.

The screen protector 102 has a length 107, a width 109, and an outer periphery 110. In some embodiments, the length 107 may be between about 133 millimeters and 135 millimeters and the width 109 may be between about 60 millimeters and 62 millimeters. In other embodiments, a different length 107 and a different width 109 may be used as desired. In some embodiments, the length 107 may be no more than 2.5 times the width 109.

The outer periphery 110 is defined by the edges of the screen protector 102 and the outer periphery 110 defines the general shape of the screen protector 102. The general shape of the screen protector 102 may correspond to the general shape of the screen of the mobile device it is meant to be applied to (e.g., mobile device 101). Different screen protectors 102 may be manufactured for different mobile devices, and the screen protector 102 along with any of the components of the system 100 may have different general shapes to accommodate the mobile devices to be protected.

The screen protector 102 may have a top cutout 111 to accommodate the speaker 159 of the mobile device 101 and the screen protector 102 may have a bottom cutout 113 to accommodate the front button 157 of the mobile device 101. In some embodiments, the profile of the top cutout 111 and/or the profile of the bottom cutout 113 may closely match the profile of the speaker 159 and/or the profile of the front button 157 in order to aid a user in aligning the mobile screen protector system 100 with the mobile device 101.

The top cutout 111 and/or the bottom cutout 113 may define part of the edge of the screen protector 102 according to various embodiments. In other embodiments, the top cutout 111 and/or the button cutout 113 may comprise one or more apertures defined by the screen protector 102. The one or more apertures may correspond to the shape of the speaker 159 and/or the front button 157. In other embodiments, the one or more apertures may comprise various different shapes interchangeably. For example, the one or more apertures may take the shape of at least one of: an ellipse, rectangle, square, triangle, or any other polygon, polyhedra, or polytope.

The back surface 105 of the screen protector 102 may be covered by a back film 108. In some embodiments, the back film 108 may prevent the adhesive deposited on the back surface 105 of the screen protector 102 from having dirt or other debris attached to the adhesive before the screen protector 102 is attached to the screen 155 of the mobile device 101. In other embodiments, the back film 108 may prevent the back surface 105 of the screen protector 102 from having dirt or other debris statically attached to the back surface 105 before the screen protector 102 is attached to the screen 155 of the mobile device 101.

The back film 108 has a length 137 and a width 139. In some embodiments, the length 137 may be between about 133 millimeters and 135 millimeters and the width 139 may be between about 60 millimeters and 62 millimeters. In other embodiments, a different length 137 and a different width 139 may be used as desired. In some embodiments, the length 137 may be no more than 2.5 times the width 139.

The general shape of the back film 108 may correspond to the general shape of the screen protector 102 it is meant to cover. The back film 108 may have a top cutout 151 to accommodate the top cutout 111 of the screen protector 102. The back film 108 may have a bottom cutout 153 to accommodate the bottom cutout 113 of the screen protector.

The back film 108 may be removed from the back surface 105 of the screen protector 102 shortly before applying the screen protector 102 onto the screen 155 of the mobile device 101. The tab 115 may be connected to the back film 108 and may be used to peel the back film 108 from the back surface 105 of the screen protector 102. In some embodiments, the tab 115 may be a separate component coupled to the back film 108. In other embodiments, the tab 115 may form an extension of the back film 108.

The back film 108 may have a surface texture configured to assist in preventing the mobile screen protector system 100 from shifting during alignment with the mobile device 101. In some embodiments, the back film 108 may have a surface coating configured to assist in preventing the mobile screen protector system 100 from shifting during alignment with the mobile device 101. For example, the back film 108 may have a rubberized coating. However, any other coating material configured to increase friction between the back film 108 and the screen 155 of the mobile device 101 may be used interchangeably according to various embodiments.

The front film 104 has a screen protector portion 117 and an anchor portion 119. The screen protector portion 117 may have a size and a shape corresponding to the size and the shape of the screen protector 102. The screen protector portion 117 may also correspond to the outer periphery 110 of the screen protector 102. In some embodiments, the screen protector portion 117 may cover at least the area of the screen protector 102 within the outer periphery 110. In other embodiments, the screen protector portion 117 may cover only a portion of the area of the screen protector 102 within the outer periphery 110.

The screen protector portion 117 and the anchor portion 119 are separated by a boundary 121. The boundary 121 may be located on one of the lengthwise edges of the screen protector portion 119. The anchor portion 119 may extend outward from the screen protector portion 117 along an edge of the screen protector portion 117 and outside of the outer periphery 110 of the screen protector 102.

While FIG. 1A illustrates the boundary 121 along a lengthwise edge of the screen protector portion 117, the boundary 121 may be located on one of the widthwise edges of the screen protector portion 117. In some embodiments, the shape of the mobile device may be any shape (e.g., a circle, a hexagon, a pentagon, or an irregular shape) and the screen protector 102 and the screen protector portion 117 is correspondingly shaped and sized.

The tab 123 may extend from the screen protector portion 117 of the front film 104. The tab 123 may extend from an edge that is opposite the edge the anchor portion 119 extends from, as shown in FIG. 1A. In other embodiments, the tab 123 may extend from an edge adjacent to the edge the anchor portion 119 extends from. The tab 123 may be outside of the outer periphery 110 of the screen protector 102.

The tab 123 may be connected to the front film 104 and may be used to peel the front film 104 from the front surface 103 of the screen protector 102. In some embodiments, the tab 123 may be a separate component coupled to the front film 104. In other embodiments, the tab 123 may form an extension of the front film 104.

In some embodiments, the tab 123 may not have any adhesive exposed on its front side or back side. In other embodiments, when the back of the tab 123 has an adhesive applied to it, a backing is applied on top of the adhesive on the back of the tab 123, such that the adhesive is not exposed to be contacted by the user. In some embodiments, when the back of the tab 123 has an adhesive applied to it, the adhesive is then removed or otherwise treated to nullify the adhering property of the adhesive. In some embodiments, an adhesive is not applied to the back of the tab 123, and only to the back sides of the screen protector portion 117 and the anchor portion 119. In other embodiments, an adhesive is not applied to any part of the front film 104.

The screen protector portion 117 has a width 127 and a length 125. In some embodiments, the length 125 may be shorter than the length 107 of the screen protector 102. In some embodiments, the width 127 may be shorter than the width 109 of the screen protector 102. In other embodiments, the length 125 may be at least as long as the length 107 of the screen protector 102 and the width 127 of the screen protector portion 117 may be at least as wide as the width 109 of the screen protector 102.

In some embodiments, the length 125 of the screen protector portion 117 may be between about 133 millimeters and 135 millimeters and the width 127 of the screen protector portion 117 may be between about 60 millimeters and 62 millimeters. In other embodiments, a different length 125 and a different width 127 may be used as desired. In some embodiments, the length 125 may be no more than 2.5 times the width 127.

The front film 104 may have a top cutout 141 to accommodate the top cutout 111 of the screen protector 102. The front film 104 may have a bottom cutout 143 to accommodate the bottom cutout 113 of the screen protector 102.

As will be described further herein, the anchor portion 119 is configured to wrap around the mobile device 101 and temporarily adhere to the mobile device 101 to anchor the position of the screen protector 102 while the back film 108 is removed. The anchor portion 119 has a width 129 and a length 131. In some embodiments, the length 131 of the anchor portion 119 is substantially similar to the length 125 of the screen protector portion 117. In other embodiments, the length 131 of the anchor portion 119 is a shorter length than the length 125 of the screen protector portion 117. A longer length 131 of the anchor portion 119 may increase stability of the anchor portion 119 to limit sliding of the anchor portion 119 after it is applied to the edge or the back of the mobile device 101, as described herein. A shorter length 131 of the anchor portion 119 may increase the ease by which the anchor portion 119 is removed from the mobile device 101 after the screen protector 102 is applied to the screen 155 of the mobile device 101.

In some embodiments, the length 131 of the anchor portion may be between about 64 millimeters and 66 millimeters and the width 129 of the anchor portion may be between about 51 millimeters and 53 millimeters. In other embodiments, a different length 131 and a different width 129 may be used as desired. In some embodiments, the length 131 may be no more than 1.5 times the width 129.

In other embodiments, the front film 104 and/or the back film 108 may have an additional anchor portion configured to assist in preventing the mobile screen protector system 100 from shifting during alignment with the mobile device 101.

The width 129 of the anchor portion 119 may be sufficiently wide to span a side edge of the mobile device 101 and at least portion of the back surface of the mobile device 101. In other embodiments, the width 129 of the anchor portion 119 may span only the side edge of the mobile device 101.

The system 100 may include an anchor cover film 106. The anchor cover film 106 is configured to cover the back surface of the anchor portion 119 of the front film 104. In some embodiments, the anchor cover film 106 may protect the adhesive disposed on the back surface of the anchor portion 119 from attracting dust and other materials before the anchor portion 119 is applied to the side edge and/or back of the mobile device 101.

The anchor cover film 106 has a width 133 and a length 135. In some embodiments, the length 135 of the anchor cover film 106 is substantially similar to the length 131 of the anchor portion 119 of the front film 104. In other embodiments, the length 135 of the anchor cover film 106 is a shorter length than the length 131 of the anchor portion 119 of the front film 104. In some embodiments, the width 133 of the anchor cover film 106 is substantially similar to the width 129 of the anchor portion 119 of the front film 104. In other embodiments, the width 129 of the anchor cover film 106 is a shorter width than the width 129 of the anchor portion 119 of the front film 104.

In some embodiments, the length 135 of the anchor cover film may be between about 64 millimeters and 66 millimeters and the width 133 of the anchor portion may be between about 51 millimeters and 53 millimeters. In other embodiments, a different length 135 and a different width 133 may be used as desired. In some embodiments, the length 135 may be no more than 1.5 times the width 133.

The tab 132 may be connected to the anchor cover film 106 and may be used to peel the anchor cover film 106 from the anchor portion 119 of the front film 104. In some embodiments, the tab 132 may be a separate component coupled to the anchor cover film 106. In other embodiments, the tab 132 may form an extension of the anchor cover film 106.

Figure 1B:
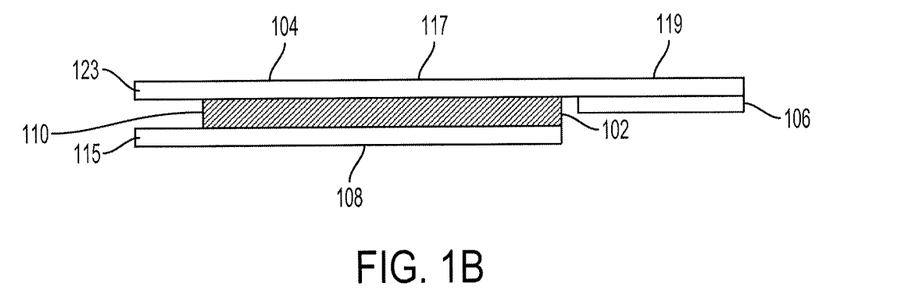
FIG. 1B illustrates the mobile device screen protector system of FIG. 1A, according to various aspects of the present invention.

FIG. 1B is a side perspective view of the screen protector system 100 of FIG. 1A. according to an embodiment of the present invention. The screen protector 102, having an outer periphery 110, is depicted as being attached to the front film 104 and the back film 108. The front film 104 and the back film 108 may be attached to the screen protector 102 via an adhesive. In other embodiments, the front film 104 and the back film 108 may be attached to the screen protector 102 via an electrostatic force.

The tab 115 extends away from the back film 108 and outside the outer periphery 110 of the screen protector 102. As depicted, the tab 115 forms an extension of the back film 108. In some embodiments, the tab 115 may be a separate component coupled to the back film 108.

The tab 123 extends away from the screen protector portion 117 of the front film 104 and outside the outer periphery 110 of the screen protector 102. As depicted, the tab 123 forms an extension of the front film 104. In some embodiments, the tab 123 may be a separate component coupled to the front film 104.

The anchor cover film 106 is depicted as being attached to the anchor portion 119 of the front film 104. The anchor portion 119 extends away from the screen protector portion 117 of the front film 104 and outside the outer periphery 110 of the screen protector 102.

The features of the mobile device screen protector system 100 may be utilized with any embodiment of screen protector system disclosed herein.

FIGS. 2A-2H illustrate the application of the mobile device screen protector system 200 to a mobile device 201 according to an embodiment of the present invention. The mobile device screen protector system 200 is similar to the mobile device screen protector system 100, and like parts are numbered similarly.

Figure 2A:
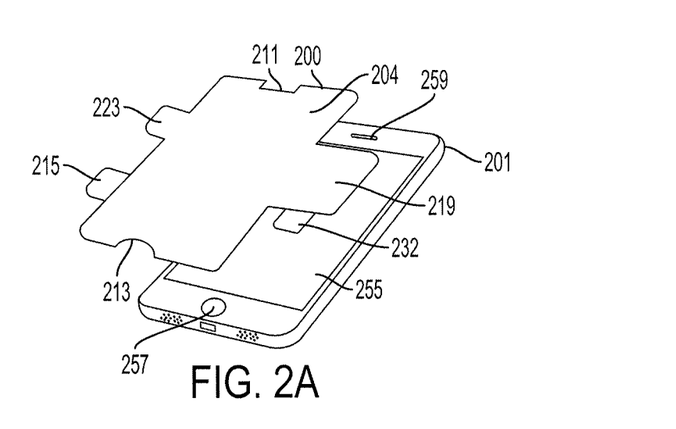
FIGS. 2A-2H illustrate an application of the mobile device screen protector system, according to an aspect of the present invention.

FIG. 2A illustrates the mobile device 201 and the mobile device screen protector system 200. In some embodiments, the system 200 may include the mobile device 201. The mobile device 201 has a screen 255, a front button 257 and a speaker 259. The screen protector has a top cutout 211 for the speaker 259 of the mobile device 201 and the screen protector has a bottom cutout 213 for the front button 257 of the mobile device 201. The screen protector system 200 has a front film 204, an anchor portion 219 of the front film 204, an anchor cover film 206, a tab 223 for the front film 204, and a tab 215 for a back film. The screen protector is covered on its front surface by the front film 204 and covered on its back surface by the back film.

Figure 2B:
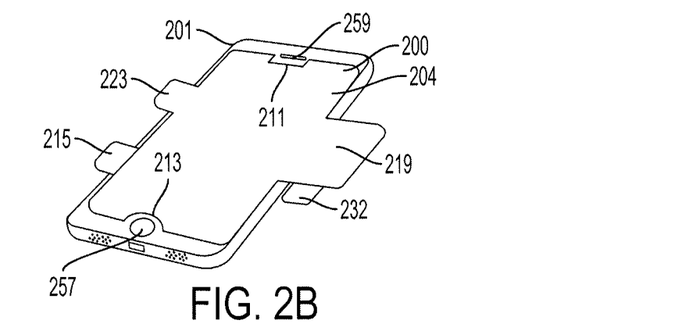

FIG. 2B illustrates the mobile device screen protector system 200 aligned with the mobile device 201. The alignment of the mobile device screen protector system 200 may be performed by a user. The screen protector is still covered on its front surface by the front film 204 and still covered on its back surface by a back film. The screen protector and the screen protector portion of the front film 204 are sized and shaped corresponding to the screen 255 of the mobile device 201. The anchor portion 219 extends outward from the screen protector portion and outside of the outer periphery of the screen protector. A user, during alignments, may align the edges of the screen protector with the edges of the screen 255 and aligns the top cutout 211 with the speaker 259 and the bottom cutout 213 with the front button 257. At this point, the screen protector is not attached to the screen 255 of the mobile device 201.

In some embodiments, the user may only align the edges of the screen protector with the edges of the screen 255. In other embodiments, the user may only align the top cutout 211 with the speaker 259. In other embodiments, the user may only align the bottom cutout 213 with the screen front button 257.

The back film may have a surface texture configured to assist in preventing the mobile screen protector system 200 from shifting during alignment with the mobile device 201. In some embodiments, the back film may have a surface coating configured to assist in preventing the mobile screen protector system 200 from shifting during alignment with the mobile device 201. For example, the back film may have a rubberized coating. However, any other coating material configured to increase friction between the back film and the screen 255 of the mobile device 201 may be used interchangeably according to various embodiments. In other embodiments, the front film 204 and/or the back film may have an additional anchor portion configured to assist in preventing the mobile screen protector system 200 from shifting during alignment with the mobile device 201.

Figure 2C:
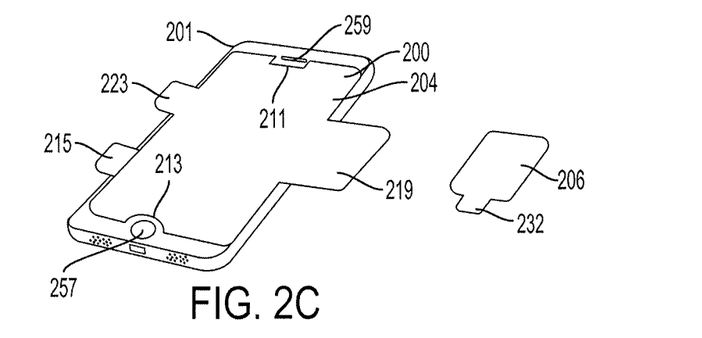

FIG. 2C illustrates the anchor cover film 206 removed from the back film of the screen protector system 200. The user may remove the anchor cover film 206 by holding a tab 232 on the anchor cover film 206. Upon removal of the anchor cover film 206, there may be adhesive exposed on a back side of the anchor portion 219. In other embodiments, there may be adhesive on the anchor cover film 206 and residue on the back side of the anchor portion 219. The screen protector is still covered on its front surface by the front film 204 and still covered on its back surface by a back film. At this point, the screen protector is still not attached to the screen 255 of the mobile device 201.

Figure 2D:
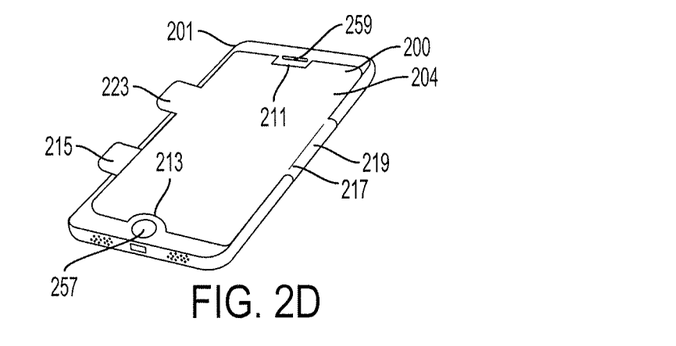

FIG. 2D illustrates the anchor portion 219 folded around the mobile device 201. The adhesive disposed on the back side of the anchor portion 219 connects the front film 204 to the mobile device 201. The anchor portion 219 is folded along a boundary 217. The anchor portion 219 contacts an edge and the back of the mobile device 202. In some embodiments, the anchor portion 219 may only contact an edge of the mobile device 202. In other embodiments, the anchor portion 219 may only contact the back of the mobile device 202. At this point, the screen protector is still not attached to the screen 255 of the mobile device 201, but the alignment between the screen protector and the screen 255 of the mobile device 201 is established.

While the anchor portion 219 is being wrapped around the mobile device 201 by a user, the alignment of the mobile device screen protector system 200 may be maintained by the user. In some embodiments, the alignment of the mobile device screen protector system 200 may be maintained due to the surface texture of the back film. In other embodiments, the alignment of the mobile screen protector system 200 may be maintained due an additional anchor portion on either the front film or the back film.

Figure 2E:
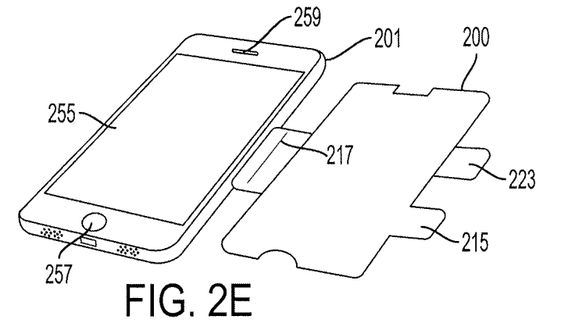

FIG. 2E illustrates the beginning the process of removing the back film 215 and applying the screen protector to the screen 255 of the mobile device 201. The screen protector is rotated about the boundary 217 by a user. The boundary 217 forms a hinge, such that the screen 255 of the mobile device 201 and the back film 215 of the mobile device screen protector system 200 is exposed. This step may be likened to a book being opened, where the mobile device 201 and the mobile device screen protector system 200 are the covers of the book.

A user may rotate the mobile device screen protector system 200 about the boundary 217 by the gripping tabs 215 or 223. In other embodiments, the user may rotate the mobile device screen protector system 200 about the boundary 217 by gripping an edge of the mobile device screen protector system 200. The screen protector is still covered on its front surface by the front film 204 and the screen protector is still not attached to the screen 255 of the mobile device 201.

Figure 2F:
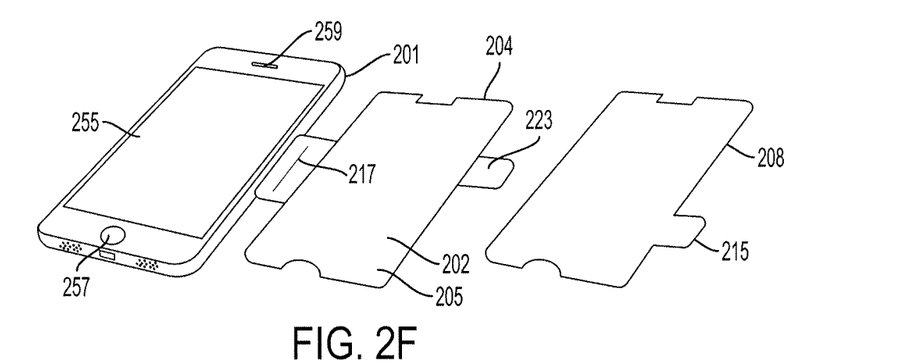

FIG. 2F illustrates the screen protector 202 with the back film 208 removed and the back surface 205 of the screen protector 202 exposed. The back surface 205 of the screen protector 202 may have an adhesive applied on the surface such that the screen protector 202 adheres to the screen 255 of the mobile device 201. In other embodiments, the screen protector 202 may be configured to attach to the screen 255 of the mobile device 201 without adhesive according to various embodiments. For example, the screen protector 202 may attach to the screen 255 of the mobile device 201 via an electrostatic force.

The user may separate the back film 208 from the screen protector 202 by holding the tab 215 and peeling the back film 208. The user may also hold tab 223 while peeling the back film 223. Upon removal of the back film 208 from the back surface 205 of the screen protector 202, there may be little to no residue on the back film 208 of the adhesive used to attach the back film 208 to the back surface 205 of the screen protector 202. In other embodiments, the back film 208 may stick to the back surface 205 of the screen protector via an electrostatic force. The screen protector 202 is still not adhered to the screen 255 of the mobile device 201.

Figure 2G:
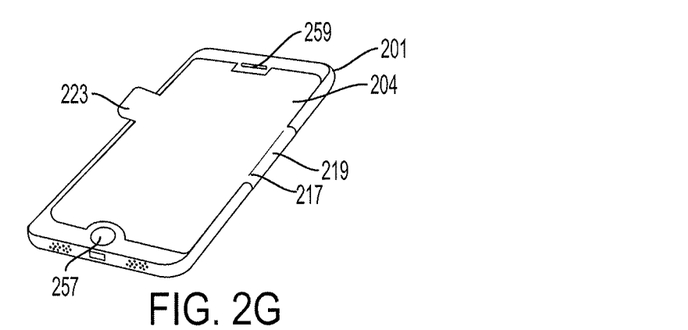

FIG. 2G illustrates the screen protector 202 attached to the screen 255 of the mobile device 201. The user may hold the tab 223 and rotate the screen protector 202 about the boundary 217, which serves as a hinge. In some embodiments, the user may hold an edge of the screen protector 202 and rotate the screen protector 202 about the boundary 217. The anchor portion 219 may be attached to the side of the mobile device 201 and the back of the mobile device 201, thereby maintaining the relative positioning of the screen protector 202 and the screen 255 of the mobile device 201. This step may be likened to a book being closed.

In some embodiments, the anchor portion 219 may be attached only to the side of the mobile device 201. In other embodiments, the anchor portion 219 may be attached only to the back of the mobile device 201.

The adhesive applied to the back surface 205 of the screen protector 202 may make contact with the screen 255 of the mobile device 201 and cause the screen protector 202 to be removably attached to the screen 255. In other embodiments, the back surface 205 of the screen protector 202 may make contact with the screen 255 of the mobile device 201 and cause the screen protector 202 to be removably attached to the screen 255 via an electrostatic force.

In some embodiments, the attachment of the screen protector 202 and the screen 255 may be better established by the user pressing down on the screen protector 202 and removing air bubbles that may be trapped between the screen protector 202 and the screen 255. In other embodiments, the screen protector 202 may attach to the screen 255 without any air bubbles becoming trapped between the screen protector 202 and the screen 255.

Figure 2H:
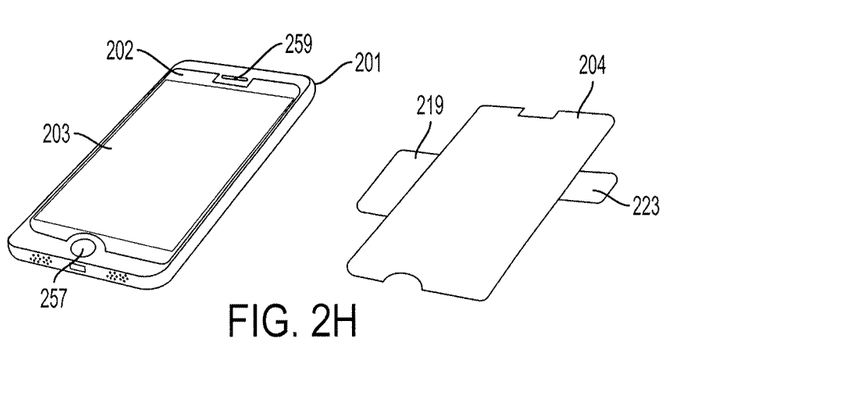

FIG. 2H illustrates the front film 204 removed from the front surface 203 of the screen protector 202. The user may hold the tab 223 to remove the front film 204 from the front surface 203. The front film 204 may remain attached to the mobile device 201 by the anchor portion 219 of the front film 204.

After the user has removed the front film 204 from the front surface 203 the user may remove the anchor portion 219 from the edge of the mobile device 201 and the back of the mobile device 201. Upon removal of the anchor portion 219 from the edge of the mobile device 201 and the back of the mobile device 201, there may be little to no residue of the adhesive used to attach the anchor portion 219 to the mobile device 201.

The screen protector 202 may be removably attached to the screen 255 of the mobile device 201 such that upon removal of the screen protector 202 from the screen 255 of the mobile device 201, there may be little to no residue on the screen 255 of the adhesive used to attach the screen protector 202 to the screen 255.

The features of the mobile device screen protector system 200 may be utilized with any embodiment of screen protector system disclosed herein.

Figure 3:
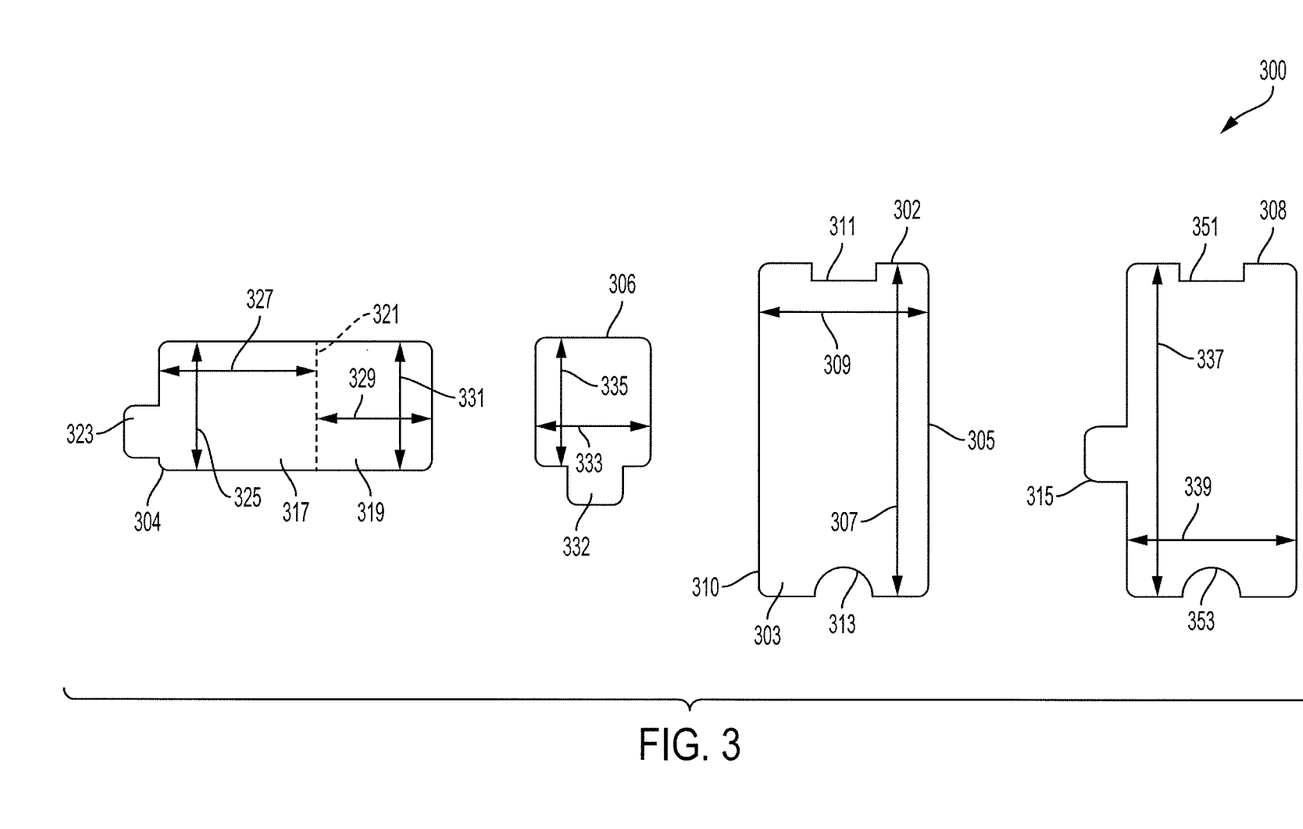
FIG. 3 illustrates the parts of a mobile device screen protector system, according to various aspects of the present invention.

FIG. 3 illustrates an embodiment of the mobile device screen protector system 300. The system 300 includes a screen protector 302, a front film 304, and a back film 308. The screen protector system 300 is similar to the screen protector systems 100 and 200 depicted in FIGS. 1A-1B and FIGS. 2A-2H respectively, and like elements are numbered similarly.

The screen protector 302 may be a rigid screen protector made of tempered glass. The screen protector 302 may be a flexible screen protector made of a plastic material. In some embodiments, the screen protector 302 may be a laminate of tempered glass and a plastic material. The screen protector 302 has a front surface 303 and a back surface 305. The back surface 305 is configured to contact the screen of the mobile device and the front surface 303 is configured to be exposed and protect the screen of the mobile device. In some embodiments, the screen protector 302 may have an adhesive applied to the back surface 305. The adhesive may assist in the screen protector 302 remaining attached to the screen of the mobile device. In some embodiments, the screen protector 302 may be removed from the screen of the mobile device without leaving any adhesive remaining on the screen.

In some embodiments, the adhesive may cover the entire back surface 305 of the screen protector 302. In other embodiments, the adhesive may cover only a portion of the back surface 305 of the screen protector 302. The screen protector 302 may be configured to attach to the screen of a mobile device without adhesive. For example, the screen protector 302 may attach to the screen of a mobile device via an electrostatic force.

The screen protector 302 has a length 307, a width 309, and an outer periphery 310. In some embodiments, the length 307 may be between about 133 millimeters and 135 millimeters and the width 309 may be between about 60 millimeters and 62 millimeters. In other embodiments, a different length 307 and a different width 309 may be used as desired. In some embodiments, the length 307 may be no more than 2.5 times the width 309.

The outer periphery 310 is defined by the edges of the screen protector 302 and the outer periphery 310 defines the general shape of the screen protector 302. The general shape of the screen protector 302 may correspond to the general shape of the screen of the mobile device it is meant to be applied to. Different screen protectors 302 may be manufactured for different mobile devices, and the screen protector 302 and any of the components of the system 300 may have different general shapes to accommodate the mobile devices to be protected.

The screen protector 302 may have a top cutout 311 for a speaker of the mobile device and the screen protector 302 may have a bottom cutout 313 for a front button of the mobile device. In some embodiments, the top cutout 311 and/or the bottom cutout 313 may closely match the speaker and/or the front button in order to aid a user in aligning the mobile screen protector system 300 with the mobile device.

The screen protector 302 may have a top cutout 311 to accommodate the speaker of the mobile device and the screen protector 302 may have a bottom cutout 313 to accommodate the front button 357 of the mobile device. In some embodiments, the profile of the top cutout 311 and/or the profile of the bottom cutout 313 may closely match the profile of the speaker and/or the profile of the front button in order to aid a user in aligning the mobile screen protector system 300 with the mobile device.

The top cutout 311 and/or the bottom cutout 313 may define part of the edge of the screen protector 302 according to various embodiments. In other embodiments, the top cutout 311 and/or the button cutout 313 may comprise one or more apertures defined by the screen protector 302. The one or more apertures may correspond to the shape of the speaker and/or the front button. In other embodiments, the one or more apertures may comprise various different shapes interchangeably. For example, the one or more apertures may take the shape of at least one of: an ellipse, rectangle, square, triangle, or any other polygon, polyhedra, or polytope.

The back surface 305 of the screen protector 302 may be covered by a back film 308. In some embodiments, the back film 308 may prevent the adhesive deposited on the back surface 305 of the screen protector 302 from becoming dirty before the screen protector 302 is attached to the screen of the mobile device. In other embodiments, the back film 308 may prevent the back surface 305 of the screen protector 302 from becoming dirty before the screen protector 302 is attached to the screen of the mobile device.

The back film 308 may have a surface texture configured to assist in preventing the mobile screen protector system 300 from shifting during alignment with the mobile device. In some embodiments, the back film 308 may have a surface coating configured to assist in preventing the mobile screen protector system 300 from shifting during alignment with the mobile device. For example, the back film 308 may have a rubberized coating. However, any other coating material configured to increase friction between the back film 308 and the screen of the mobile device may be used interchangeably according to various embodiments.

The back film 308 may be removed from the back surface 305 shortly before applying the screen protector 302 onto the screen of the mobile device. The tab 315 may be connected to the back film 308 and may be used to peel the back film 308 from the back surface 305 of the screen protector 302. In some embodiments, the tab 315 may be a separate component coupled to the back film 308. In other embodiments, the tab 315 may form an extension of the back film 308.

The back film 308 has a length 337 and a width 339. In some embodiments, the length 337 may be between about 133 millimeters and 135 millimeters and the width 339 may be between about 60 millimeters and 62 millimeters. In other embodiments, a different length 337 and a different width 339 may be used as desired. In some embodiments, the length 337 may be no more than 2.5 times the width 339.

The general shape of the back film 308 may correspond to the general shape of the screen protector 302 it is meant to cover. The back film 308 may have a top cutout 351 to accommodate the top cutout 311 of the screen protector 302. The back film 308 may have a bottom cutout 353 to accommodate the bottom cutout 313 of the screen protector.

The front film 304 has a screen protector portion 317 and an anchor portion 319. Unlike the screen protector portion 117 of system 100, the screen protector portion 317 has a size and a shape substantially smaller than the size and the shape of the screen protector 302. In some embodiments, the screen protector portion 317 has a size of approximately half of the area of the screen protector 302. The screen protector portion 317 may cover a central portion of the screen protector 302.

The screen protector portion 317 and the anchor portion 319 are separated by a boundary 321. The boundary 321 may be located on one of the lengthwise edges of the screen protector portion 319. The anchor portion 319 may extend outward from the screen protector portion 317 along an edge of the screen protector portion 317 and outside of the outer periphery 310 of the screen protector 302.

While FIG. 3 illustrates the boundary 321 along a lengthwise edge of the screen protector portion 317, the boundary 321 may be located on one of the widthwise edges of the screen protector portion 317. In some embodiments, the shape of the mobile device may be any shape (e.g., a circle, a hexagon, a pentagon, or an irregular shape) and the screen protector 302 and screen protector portion 317 is appropriately shaped and sized.

The tab 323 may extend from the screen protector portion 317 of the front film 304. The tab 323 may extend from an edge that is opposite the edge the anchor portion 319 extends from, as shown in FIG. 3. In other embodiments, the tab 323 may extend from an edge adjacent to the edge the anchor portion 319 extends from. The tab 323 may be outside of the outer periphery 310 of the screen protector 302.

The tab 323 may be connected to the front film 304 and may be used to peel the front film 304 from the front surface 303 of the screen protector 302. In some embodiments, the tab 323 may be a separate component coupled to the front film 304. In other embodiments, the tab 323 may form an extension of the front film 304.

In some embodiments, the tab 323 may not have any adhesive exposed on its front side or back side. In other embodiments, when the back of the tab 323 has an adhesive applied to it, a backing is applied on top of the adhesive on the back of the tab 323, such that the adhesive is not exposed to be contacted by the user. In some embodiments, when the back of the tab 323 has an adhesive applied to it, the adhesive is then removed or otherwise treated to nullify the adhering property of the adhesive. In some embodiments, an adhesive is not applied to the back of the tab 323, and only to the back sides of the screen protector portion 317 and the anchor portion 319. In other embodiments, an adhesive is not applied to any part of the front film 304.

The screen protector portion 317 has a width 327 and a length 325. The length 325 is shorter than the length 307 of the screen protector 302. The width 327 is substantially the same width as the width 309 of the screen protector 302. In some embodiments, the width 327 may be shorter than the width 309 of the screen protector 302. In other embodiments, the width 327 of the screen protector portion 317 may be wider than the width 309 of the screen protector 302.

In some embodiments, the length 325 of the screen protector portion 317 may be between about 64 millimeters and 66 millimeters and the width 327 of the screen protector portion 317 may be between about 60 millimeters and 62 millimeters. In other embodiments, a different length 325 and a different width 327 may be used as desired. In some embodiments, the length 325 may be no more than 1.2 times the width 327.

The anchor portion 319 has a width 329 and a length 331. In some embodiments, the length 331 of the anchor portion 319 is substantially similar to the length 325 of the screen protector portion 317. In other embodiments, the length 331 of the anchor portion 319 is a shorter length than the length 325 of the screen protector portion 317. A longer length 331 of the anchor portion 319 may increase stability of the anchor portion 319 to limit sliding of the anchor portion 319 after it is applied to the edge or the back of the mobile device, as described herein. A shorter length 331 of the anchor portion 319 may increase the ease by which the anchor portion 319 is removed from the mobile device after the screen protector is applied to the screen of the mobile device. The width 329 of the anchor portion 319 may be sufficiently wide to span a side edge of the mobile device and at least portion of the back surface of the mobile device. In other embodiments the width 329 of the anchor portion 319 may span only the side edge of the mobile device.

In some embodiments, the length 331 of the anchor portion may be between about 64 millimeters and 66 millimeters and the width 329 of the anchor portion may be between about 51 millimeters and 53 millimeters. In other embodiments, a different length 331 and a different width 329 may be used as desired. In some embodiments, the length 331 may be no more than 1.5 times the width 329.

In other embodiments, the front film 304 and/or the back film 308 may have an additional anchor portion configured to assist in preventing the mobile screen protector system 300 from shifting during alignment with the mobile device.

The system 300 may include an anchor cover film 306. The anchor cover film 306 may be configured to cover the back surface of the anchor portion 319 of the front film 304.

In some embodiments, the anchor cover film 306 may protect the adhesive disposed on the back surface of the anchor portion 319 from attracting dust and other materials before the anchor portion 319 is applied to the side edge and/or back of the mobile device 301.

The anchor cover film 306 may have a width 333 and a length 335. In some embodiments, the length 335 of the anchor cover film 306 is substantially similar to the length 331 of the anchor portion 319 of the front film 304. In other embodiments, the length 335 of the anchor cover film 306 is a shorter length than the length 331 of the anchor portion 319 of the front film 304. In some embodiments, the width 333 of the anchor cover film 306 is substantially similar to the width 329 of the anchor portion 319 of the front film 304. In other embodiments, the width 329 of the anchor cover film 306 is a shorter width than the width 329 of the anchor portion 319 of the front film 304.

In some embodiments, the length 335 of the anchor cover film may be between about 64 millimeters and 66 millimeters and the width 333 of the anchor portion may be between about 51 millimeters and 53 millimeters. In other embodiments, a different length 335 and a different width 333 may be used as desired. In some embodiments, the length 335 may be no more than 1.5 times the width 333.

The tab 332 may be connected to the anchor cover film 306 and may be used to peel the anchor cover film 306 from the anchor portion 319 of the front film 304. In some embodiments, the tab 332 may be a separate component coupled to the anchor cover film 306. In other embodiments, the tab 332 may form an extension of the anchor cover film 306.

The features of the mobile device screen protector system 300 may be utilized with any embodiment of screen protector system disclosed herein.

Figure 4:
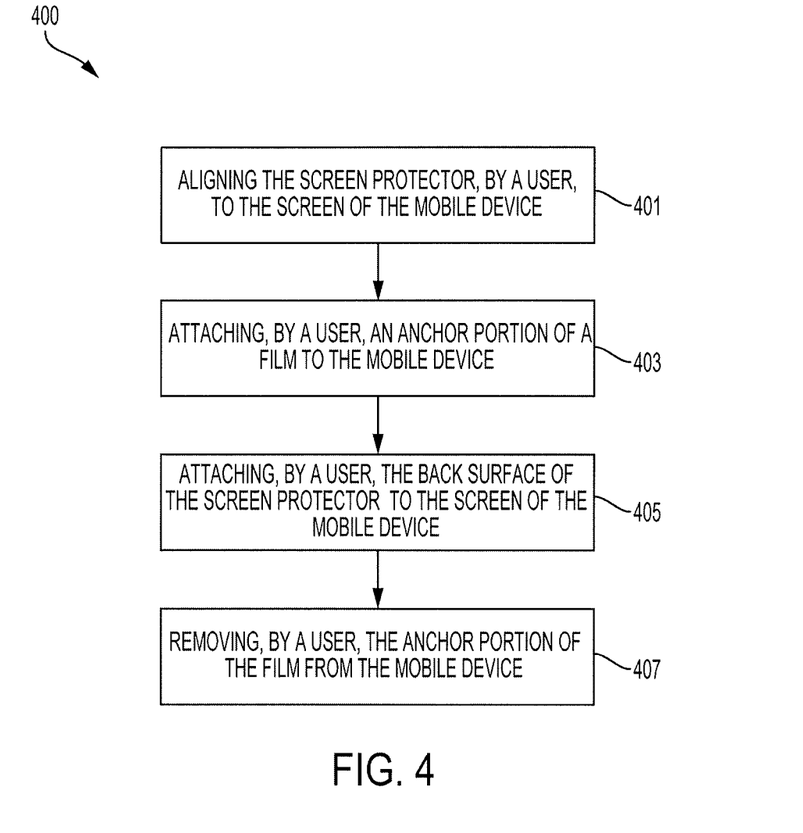
FIG. 4 illustrates a method for applying a mobile device screen protector system, according to various aspects of the present invention.

FIG. 4 is a flowchart 400 for a method of applying a screen protector to a screen of a mobile device. A user may align a screen protector (e.g., screen protector 102, 202, 302) to the screen of a mobile device (Step 401). The screen protector may have a front film (e.g., front film 104, 204, 304) and a back film (e.g., back film 108, 208, 308) attached to it. In some embodiments, aligning the screen protector to the screen of the mobile device may comprise aligning periphery edges of the screen protector to the edges of the screen of the mobile device. In other embodiments, aligning the screen protector to the screen of the mobile device may comprise aligning one or more cutouts of the screen protector to a speaker or a button on the mobile device.

The back film (e.g., back film 108, 208, 308) may have a surface texture configured to assist in preventing the mobile device screen protector system (e.g., mobile device screen protector system 100, 200, 300) from shifting during alignment with the mobile device. In some embodiments, the back film (e.g., back film 108, 208, 308) may have a surface coating configured to assist in preventing the mobile screen protector system (e.g., mobile device screen protector system 100, 200, 300) from shifting during alignment with the mobile device. In other embodiments, the front film (e.g., front film 104, 204, 304) and/or the back film (e.g., back film 108, 208, 308) may have an additional anchor portion configured to assist in preventing the mobile screen protector system (e.g., mobile device screen protector system 100, 200, 300) from shifting during alignment with the mobile device.

In some embodiments, a user may the remove an anchor cover film (e.g., anchor cover film 106, 206, 306) from an anchor portion (e.g., anchor portion 119, 219, 319) of a film (e.g., front film 104, 204, 304). The anchor cover film may be configured to cover the back surface of the anchor portion of the front film. In some embodiments, the anchor cover film may protect adhesive disposed on a back surface of the anchor portion from attracting dust and other materials before the anchor portion is applied to the side edge and/or back of the mobile device.

In some embodiments, a user may remove the anchor cover film from the back surface of the anchor portion by first gripping a tab (e.g., tab 132, 332). The tab may be a separate component coupled to the anchor cover film. In other embodiments, the tab may form an extension of the anchor cover film.

A user may then attach an anchor portion (e.g., anchor portion 119, 219, 319) of a film (e.g., front film 104, 204, 304) to the mobile device (Step 403). The anchor portion may be attached to an edge and a back side of the mobile device. In some embodiments, the anchor portion may be attached only to the edge of the mobile device. In other embodiments, the anchor portion may be attached only to the back side of the mobile device.

In some embodiments, a user may then remove a back film (e.g., back film 108, 208, 308) from a back surface (e.g., back surface 105, 205, 305) of the screen protector (e.g., screen protector 102, 202, 302). The back film may prevent an adhesive deposited on the back surface of the screen protector from becoming dirty before the screen protector is attached to the screen of the mobile device. In other embodiments, the back film may prevent the back surface of the screen protector from becoming dirty before the screen protector is attached to the screen of the mobile device.

In some embodiments, a user may remove the back film from the back surface by first gripping a tab (e.g., tab 115, 315). The tab may be a separate component coupled to the back film. In other embodiments, the tab may form an extension of the back film.

A user may then attach a back surface (e.g., back surface 105, 205, 305) of the screen protector (e.g., screen protector 102, 202, 302) to the screen of the mobile device (Step 405). An adhesive may be disposed on the entire back surface of the screen protector to aid in the attachment of the screen protector to the screen of the mobile device. In some embodiments, an adhesive may be disposed on only a portion of the back surface of the screen protector. In other embodiments, the screen protector may attach to the screen of the mobile device without adhesive. For example, the screen protector may attach to the screen of a mobile device via an electrostatic force.

A user may then remove the anchor portion (e.g., anchor portion 119, 219, 319) of the film (e.g., front film 104, 204, 304) from the mobile device (Step 407). A user may remove the anchor portion by first gripping a tab (e.g., tab 123, 223, 323) coupled to the film. The anchor portion may be removed from the edge and the backside of the mobile device. In some embodiments, the anchor portion may be removed from only the edge of the mobile device. In other embodiments, the anchor portion may be removed from only the back side of the mobile device.

The features of the embodiments of mobile device screen protector systems disclosed herein may be interchanged, substituted, modified, or excluded as desired. The scope of the disclosure is not limited to the mobile device screen protector systems disclosed herein.

In closing, it is to be understood that although aspects of the present specification are highlighted by referring to specific embodiments, one skilled in the art will readily appreciate that these disclosed embodiments are only illustrative of the principles of the subject matter disclosed herein. Therefore, it should be understood that the disclosed subject matter is in no way limited to a particular methodology, protocol, and/or reagent, etc., described herein. As such, various modifications or changes to or alternative configurations of the disclosed subject matter can be made in accordance with the teachings herein without departing from the spirit of the present specification. Lastly, the terminology used herein is for the purpose of describing particular embodiments only, and is not intended to limit the scope of systems, apparatuses, and methods as disclosed herein, which is defined solely by the claims. Accordingly, the systems, apparatuses, and methods are not limited to that precisely as shown and described.

Certain embodiments of systems, apparatuses, and methods are described herein, including the best mode known to the inventors for carrying out the same. Of course, variations on these described embodiments will become apparent to those of ordinary skill in the art upon reading the foregoing description. The inventor expects skilled artisans to employ such variations as appropriate, and the inventors intend for the systems, apparatuses, and methods to be practiced otherwise than specifically described herein. Accordingly, the systems, apparatuses, and methods include all modifications and equivalents of the subject matter recited in the claims appended hereto as permitted by applicable law. Moreover, any combination of the above-described embodiments in all possible variations thereof is encompassed by the systems, apparatuses, and methods unless otherwise indicated herein or otherwise clearly contradicted by context.

Groupings of alternative embodiments, elements, or steps of the systems, apparatuses, and methods are not to be construed as limitations. Each group member may be referred to and claimed individually or in any combination with other group members disclosed herein. It is anticipated that one or more members of a group may be included in, or deleted from, a group for reasons of convenience and/or patentability. When any such inclusion or deletion occurs, the specification is deemed to contain the group as modified thus fulfilling the written description of all Markush groups used in the appended claims.

Unless otherwise indicated, all numbers expressing a characteristic, item, quantity, parameter, property, term, and so forth used in the present specification and claims are to be understood as being modified in all instances by the term "about." As used herein, the term "about" means that the characteristic, item, quantity, parameter, property, or term so qualified encompasses an approximation that may vary, yet is capable of performing the desired operation or process discussed herein.

The terms "a," "an," "the" and similar referents used in the context of describing the systems, apparatuses, and methods (especially in the context of the following claims) are to be construed to cover both the singular and the plural, unless otherwise indicated herein or clearly contradicted by context. All methods described herein can be performed in any suitable order unless otherwise indicated herein or otherwise clearly contradicted by context. The use of any and all examples, or exemplary language (e.g., "such as") provided herein is intended merely to better illuminate the systems, apparatuses, and methods and does not pose a limitation on the scope of the systems, apparatuses, and methods otherwise claimed. No language in the present specification should be construed as indicating any non-claimed element essential to the practice of the systems, apparatuses, and methods.

What is claimed is:

1. A film for maintaining an alignment of a screen protector and a mobile device when applying the screen protector onto a screen of the mobile device, the mobile device having a front side, a back side, and a plurality of edges located around a perimeter of the mobile device between the front side and the back side, the film comprising:
   a screen protector portion removably attached to a front surface of the screen protector, the screen protector portion having a tab with a front side and a back side and extending from the screen protector portion on a first edge, the front side and the back side not exposing adhesive material, the tab configured to be used to remove the film from the front surface of the screen protector once the screen protector is attached to the mobile device; and
   an anchor portion connected to and extending away from the screen protector portion on a second edge, the first edge and the second edge being across from each other, the anchor portion configured to wrap around a first edge of the plurality of edges of the mobile device and be removably attached to at least one of the first edge or the back side of the mobile device via an adhesive.

2. The film of claim 1, wherein the anchor portion and the screen protector portion form a hinge at a junction between the screen protector portion and the anchor portion.

3. The film of claim 1, wherein the screen protector portion of the film has a shape corresponding to the outer periphery of the screen protector.

4. The film of claim 1, further comprising an anchor cover film removably connected to a back side of the anchor portion of the film, the anchor cover film configured to cover the back side of the anchor portion until the anchor film is removed.

5. The film of claim 1, wherein the screen protector portion of the film has two lengthwise edges and two widthwise edges, a length of the two lengthwise edges being greater than a width of the two widthwise edges, and
   wherein the anchor portion extends from one of the two lengthwise edges of the screen protector portion.

6. The film of claim 5, wherein the anchor portion is connected to the screen protector portion of the film along substantially an entire length of the one of the two lengthwise edges.

7. A screen protector system for a mobile device having a screen, a front side, a rear side, and a plurality of side edges located around a perimeter of the mobile device, the system comprising:
   a screen protector having a front surface, a back surface, and an outer periphery, the back surface being configured to attach to the screen of the mobile device;
   a back film removably attached to the back surface of the screen protector, the back film having a first tab with a front side and a back side and extending from a first edge of the back film, the first edge coinciding with a first side edge of the plurality of side edges of the mobile device when the screen protector is attached to the screen, the front side and the back side not exposing adhesive material, and the first tab configured to be used to remove the back film from the back surface of the screen protector before the screen protector is attached to the mobile device; and
   a front film having a screen protector portion and an anchor portion extending away from the screen protector portion, the screen protector portion being removably attached to the front surface of the screen protector, the screen protector portion having a second tab with a front side and a back side and extending from an edge of the screen protector portion, the front side and the back side not exposing adhesive material, the second tab configured to be used to remove the front film from the front surface of the screen protector once the screen protector is attached to the mobile device, and the anchor portion configured to wrap around a second side edge of the plurality of side edges of the mobile device, the first side edge and the second side edge being across from each other, and be removably attached to at least one of the second side edge or the back side of the mobile device via an adhesive.

8. The system of claim 7, wherein the screen protector portion is removably attached to the front surface of the screen protector via an adhesive.

9. The system of claim 7, wherein the back film is configured to be removed prior to the back surface of the screen protector being attached to the screen of the mobile device, the anchor portion maintaining an alignment of the screen protector and the mobile device when the back film is removed.

10. The system of claim 7, wherein at least one of the back film and the screen protector portion of the front film has a shape corresponding to the outer periphery of the screen protector.

11. The system of claim 7, further comprising an anchor cover film removably connected to a back side of the anchor portion of the front film, the anchor cover film configured to cover the back side of the anchor portion until the anchor film is removed.

12. The system of claim 7, wherein the screen protector portion of the front film has two lengthwise edges and two widthwise edges, a length of the two lengthwise edges being greater than a width of the two widthwise edges, and
  wherein the anchor portion extends from one of the two lengthwise edges of the screen protector portion.

13. The system of claim 12, wherein the anchor portion is connected to the screen protector portion of the front film along substantially an entire length of the one of the two lengthwise edges.

14. The system of claim 7, wherein the anchor portion is connected to the screen protector portion of the front film along a first edge, and
  wherein the second tab extends from the screen protector portion on a second edge of the front film, the first edge and the second edge being across from each other.

15. The system of claim 7, wherein the anchor portion is removably attached to the back side of the mobile device via the adhesive.

16. A screen protector system for a mobile device having a screen, a front side, a rear side, and a plurality of side edges located around a perimeter of the mobile device, the system comprising:
  a screen protector having a front surface, a back surface, and an outer periphery having a first lengthwise edge and a second lengthwise edge, the back surface being configured to attach to the screen of the mobile device;
  a back film removably attached to the back surface of the screen protector, the back film having a tab with a front side and a back side and extending outward from a lengthwise edge corresponding to the first lengthwise edge of the screen protector, the front side and the back side not exposing adhesive material, the tab configured to be used to remove the back film from the back surface of the screen protector before the screen protector is attached to the mobile device, the back film having a size and shape corresponding to a size and shape of the screen protector;
  a front film having:
    a screen protector portion having a size and shape corresponding to the size and shape of the screen protector, a length of the screen protector being greater than a width of the screen protector, and being removably attached to the front surface of the screen protector,
    a tab with a front side and a back side and extending away from the screen protector portion from a lengthwise edge corresponding to the first lengthwise edge of the screen protector, the front side and the back side not exposing adhesive material, and
    an anchor portion extending away from the screen protector portion from a lengthwise edge corresponding to the second lengthwise edge of the screen protector, the anchor portion configured to wrap around a first side edge of the plurality of side edges of the mobile device when the screen protector is aligned with the screen of the mobile device prior to removal of the back film, and be removably attached to the back side of the mobile device via an adhesive to maintain the alignment of the screen protector and the screen of the mobile device after removal of the back film; and
  an anchor cover film removably connected to a back side of the anchor portion of the front film, the anchor cover film configured to cover the back side of the anchor portion until the anchor film is removed, and
  wherein the tab of the back film or the tab of the front film are configured to be grasped to pivot the screen protector about an axis defined by a boundary between the anchor portion of the front film and the screen protector portion of the front film.

\* \* \* \* \*